Patented Nov. 19, 1940

2,221,968

UNITED STATES PATENT OFFICE 2,221,968

RUST REMOVER

Herbert Friedmann, New York, N. Y.

No Drawing. Application February 16, 1940,
Serial No. 319,250

6 Claims. (Cl. 148—8)

This invention relates to rust removers.

It is known to remove rust from iron by means of phosphoric acid and phosphoric acid containing agents.

The main drawback of these known rust removers is their liquid consistency; they do not adhere to the surfaces from which the rust is to be removed but run off from the same. Therefore, it is difficult with these rust removers to completely cover rusty objects, and usually the application of the rust removing agent must be repeated very often which is both time consuming and expensive.

I have found that the above mentioned drawbacks of the known rust removing agents may be obviated if the phosphoric acid is incorporated into substances adapted to form a paste which adheres to the objects to be treated but may be easily removed therefrom.

Accordingly, it is among the objects of the invention to provide a rust remover which is not liquid but has a pasty or gelatinous consistence.

Another object of the invention is to provide a rust remover which can be cheaply manufactured and which is highly efficient.

These and other objects of my invention will become apparent to those skilled in the art when the description proceeds.

In accordance with my invention phosphoric acid is mixed with low alkylated alkyl cellulose, particularly methyl cellulose. To this end, an alkyl cellulose e. g. methyl or ethyl cellulose in the form of light flakes is added to the acid and particularly a methyl cellulose may be used which easily swells in water.

It is also possible to use a highly concentrated phosphoric acid and to add the same to a cellulose ether which is swelled in water. A homogeneous gelatinous substance is formed which remains substantially unchanged even after days and weeks. The thus obtained material may be easily applied even in thick layers onto the rusty articles by means of a spatula or a hard bristle brush. After a comparatively short time, e. g. after half an hour, the rust remover may be scraped off together with the rust which has been completely loosened and an eventual residue of the paste may be removed with water. The surface which has been freed from rust may be further protected by moistening the same with a solution of soda or another alkaline liquid.

With my new paste fresh rust may be removed after a single short treatment. If the rust is of very old age, the paste treatment may be repeated. The scraped off mass may be used for the repeated treatment.

Instead of using an aqueous solution or paste of cellulose ether solutions or pastes of cellulose ethers in organic solvents or in alkali may be used as well as suspensions of the cellulose ether in suitable organic solvents.

Example I 1 gram methyl cellulose is mixed at room temperatures with 70 cubic centimeters of a 26% phosphoric acid. Depending upon the time of reaction which may be about 30 minutes an opaque jelly is produced. A slight increase of the temperature accelerates the forming of the jelly. The jelly or paste is the final product ready for use.

Example II

Under the same conditions as stated above 2 grams of methyl cellulose are mixed with 70 cubic centimeters of a 26% phosphoric acid.

Example III

Instead of using the amounts specified in Examples I and II, 2.5 grams of methyl cellulose may be mixed with 50 cubic centimeters of a 26% phosphoric acid.

Example IV 10 grams of methyl cellulose are dissolved in 333 grams of water. To the thus obtained solution 60, 80, or 100 cubic centimeters of a 26% phosphoric acid are added. A highly viscous pasty substance is obtained.

Example V 60 grams of methyl cellulose are gelatinized in 100 grams of water and 600 cubic centimeters of a 96% phosphoric acid are added. A pasty substance is thus produced wherein the phosphoric acid is uniformly distributed and which slowly changes to a thicker consistency. The thus obtained highly viscous product is ready for use. On account of the high concentration of the phosphoric acid the action of the paste is more energetic.

Example VI 60 grams of methyl cellulose are gelatinized in 150 cubic centimeters of methylene chloride to produce a thickly fluid solution. Thereafter, 600 cubic centimeters of a 96% phosphoric acid are added to produce the above mentioned jelly which is ready for use.

Example VII 10 grams ethyl cellulose are dissolved in 700 grams of water and 600 cubic centimeters of a 96% phosphoric acid are slowly added.

Depending upon whether highly viscous or less viscous alkyl cellulose are used more or less thickly fluid pastes are produced. In case highly viscous alkyl celluloses are used the percentage of alkyl celluloses may be considerably reduced. Therefore, it is advantageous to use highly viscous alkyl celluloses to increase the contents of the phosphoric acid, to reduce the costs of the manufacture, and to increase the efficiency of the material. Particularly suited are methyl celluloses which can be easily dissolved in cold water to produce viscous solutions. The remaining parts of the thus produced paste may be easily removed with water after it has been applied to a rusty metal object.

In order to remove traces of fat which may adhere to the iron to be treated fat dissolving materials may be added to the paste disclosed herein above containing low alkylated cellulose. Such fat dissolving materials are e. g. cyclohexanol and sodium sulfhydrate and the like.

It is also possible to use low alkylated cellulose ethers which are soluble in alkali for example those described in U. S. Patents 2,140,568 and 1,188,376. The thus produced compositions have the effect that the steel is protected against rust attacks for quite a long time even after the rust removing procedure has been performed. In this case the low alkylated cellulose is dissolved in sodium hydrate and the phosphoric acid is added. A rust remover is produced hereby which at the same time exerts a protective property due to its contents of alkali.

I claim:

1. A stable viscous rust removing composition consisting of a mixture of phosphoric acid and at least one low alkylated cellulose ether.

2. A stable viscous rust removing composition consisting of a mixture of phosphoric acid, of at least one low alkylated cellulose ether and of a fat dissolving substance.

3. A stable viscous rust removing composition consisting of a uniform mixture of phosphoric acid and water soluble methyl cellulose.

4. A stable viscous rust removing composition consisting of a uniform mixture of phosphoric acid and water soluble ethyl cellulose.

5. A stable viscous rust removing composition consisting of a mixture of phosphoric acid and a sodium-hydrate soluble low alkylated cellulose ether.

6. A method of removing rust from the surface of iron and steel articles comprising coating the rust-laden article with a composition consisting of a mixture of phosphoric acid and at least one low alkylated cellulose ether, removing said coating together with the dissolved rust and cleaning the article in an appropriate manner.

HERBERT FRIEDMANN.